No. 669,529. Patented Mar. 12, 1901.
J. E. KENNEDY.
DEVICE FOR TESTING LEATHER.
(Application filed June 14, 1900.)
(No Model.)
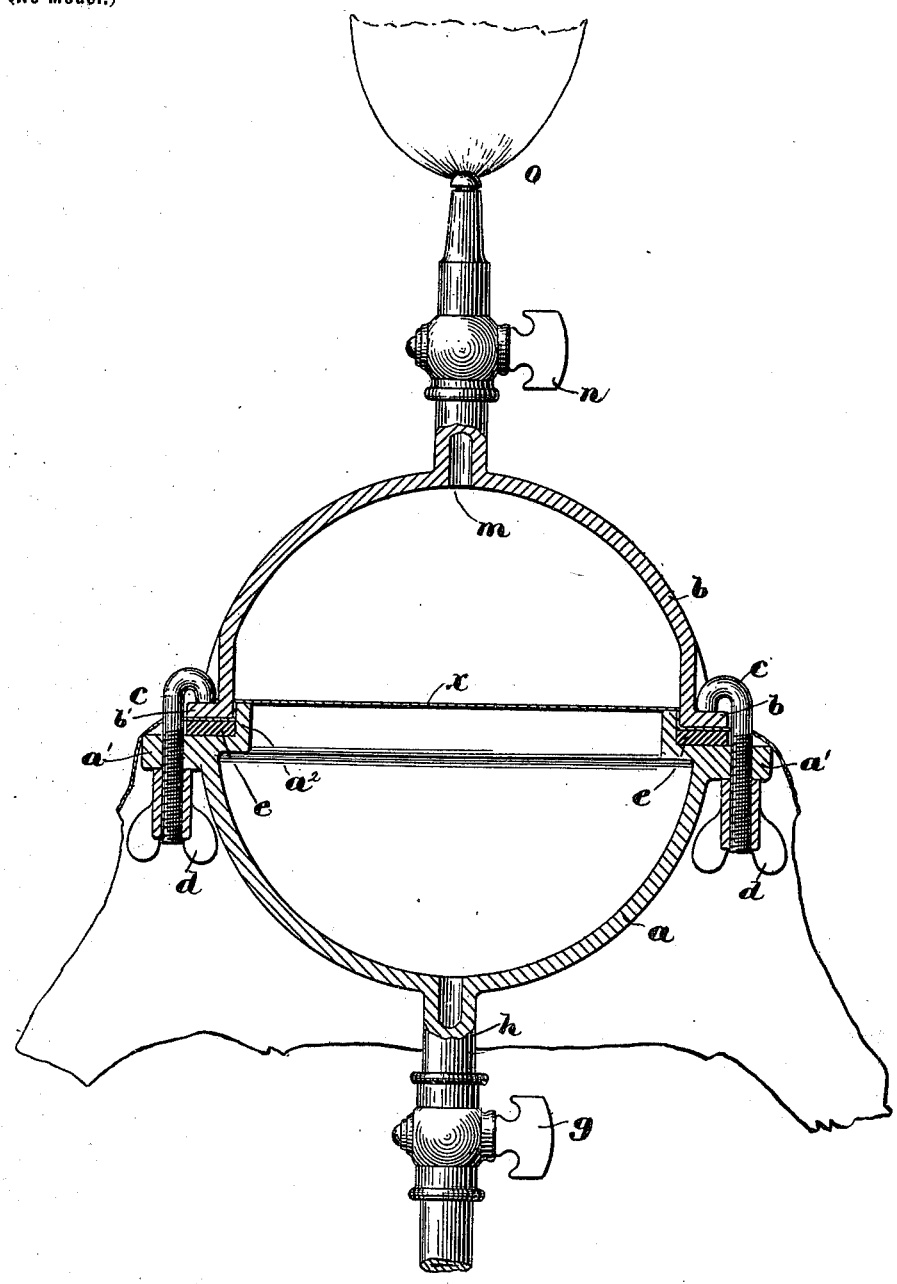
Witnesses:
Walter E. Lombard.
K. A. Dugan.
Inventor:
John E. Kennedy
by Geo. N. Goddard,
his attorney

UNITED STATES PATENT OFFICE.

JOHN E. KENNEDY, OF WINTHROP, MASSACHUSETTS.

DEVICE FOR TESTING LEATHER.

SPECIFICATION forming part of Letters Patent No. 669,529, dated March 12, 1901.

Application filed June 14, 1900. Serial No. 20,231. (No model.)

*To all whom it may concern:*

Be it known that I, JOHN E. KENNEDY, a British subject, and a resident of Winthrop, county of Suffolk, Massachusetts, have invented certain new and useful Improvements in Devices for Testing Leather, of which the following is a specification.

My invention relates to a device for illustrating or testing the porosity of different kinds of leather or other fabrics.

It comprises, generally speaking, a hollow chamber or conduit across which the leather or other fabric to be tested may be stretched, combined with an inlet-pipe in communication with a body of fluid—say, for instance, illuminating-gas under pressure—and an off-take leading to some suitable device for indicating the presence of or quantity of gas escaping through the fabric which constitutes the diaphragm to be tested.

The accompanying drawing is a side elevation, partly in section, of one of the simple forms under which I may embody my invention.

As herein shown, my apparatus comprises a separable chamber or conduit composed of two members $a$ and $b$, whose opposing edges are adapted to tightly clamp between them a piece of the fabric to be tested, which is indicated at $x$. In this form each member is provided with horizontal flanges $a'$ and $b'$, respectively. One member may also have a vertically-projecting flange or edge $a^2$, over which the fabric to be tested may be stretched. Any suitable clamping means may be employed for clamping the opposing edges tightly together with the diaphragm between them. I have shown for this purpose screw-threaded bolts $c$, provided with winged nuts $d$. A gasket $e$, of rubber or other material, may be employed to make the joining between the two members perfectly tight.

The admission of gas from the gas-main or from any suitable source of supply may be controlled by the stop-cock $g$ in the inlet-pipe $h$. The gas which passes through the diaphragm $x$ escapes through the outlet $m$, which may be controlled by the stop-cock $n$, and may issue from an ordinary gas-burner $o$, so that upon being ignited the presence and flow of the gas are clearly indicated to the observer.

Of course it will be understood that any kind of indicating device which serves to either measure the volume of the gas or in any way to indicate its presence will serve the purpose of the gas-burner. For example, a sufficient quantity of water may be poured through the outlet-passage $m$ to cover the diaphragm $x$ to any desired depth. In that case the bubbles of gas escaping through the water will serve to indicate the flow of gas. In this way the device may be used to test simultaneously the porosity of the fabric comprising the diaphragm and also its waterproof qualities.

While the testing-chamber may be made of any suitable material, I prefer to make the upper part at least of glass in order that the interior of the chamber may be visible at all times to the observer.

It will of course be understood that very great changes in form, construction, and relative arrangement may be made without departing from the spirit of my invention, the form herein shown being simply illustrative of my invention.

It will be observed that the clamping means shown in the drawing is so constructed as to permit a whole skin or side of leather to be placed in the testing device while allowing the skirts or outer portions to hang outside of the chamber. The advantage of this is twofold. In the first place it enables the skin or side to be inserted for the test without wasting it or spoiling it by cutting out a piece for the diaphragm, and, in the second place, this construction permits a thorough inspection of the leather that is being tested, so that a purchaser may satisfy himself as to the quality of the leather which is being tested without making it necessary to take the apparatus apart.

Without attempting to set forth the variations in form, construction, and arrangement which may be made in my invention or to indicate the manifold uses to which it may be applied, what I claim is—

1. A leather-testing device embracing in combination a separable gas-chamber composed of two members whose adjacent edges are formed to fit close together, a diaphragm of leather supported and tightly clamped between the adjacent edges of the said members, an inlet-pipe communicating with the space on one side of the diaphragm and a gas-burner arranged in communication with the outlet side of said chamber whereby variations in the flow of gas through the leather will be rendered visible when the gas is burning, substantially as described.

2. A leather-testing device embracing in combination a separable chamber composed of two members or parts, means for tightly clamping a skin or side of leather between the two members so that that portion thereof lying inside the chamber forms an imperforate diaphragm separating the two parts of the chamber while the remaining portion of the skin is allowed to fall outside of the chamber to permit the inspection thereof, and a device for indicating variations in the flow of gas which passes through the diaphragm, substantially as described.

3. In a device of the kind described, a testing-chamber, having a transparent wall, a diaphragm stretched across said chamber, an inlet-pipe and an outlet communicating with said chamber on opposite sides of the diaphragm and a gas-burner communicating with the outlet, substantially as described.

In witness whereof I have hereunto set my hand this 12th day of June, 1900.

JOHN E. KENNEDY.

In presence of—
MAUDE TAYLOR,
GEO. N. GODDARD.